US012798129B2

(12) United States Patent
Li

(10) Patent No.: US 12,798,129 B2
(45) Date of Patent: Nov. 17, 2026

(54) CUTTING TOOL

(71) Applicant: HANGZHOU GREAT STAR INDUSTRIAL CO., LTD., Hangzhou City (CN)

(72) Inventor: Yueming Li, Hangzhou City (CN)

(73) Assignee: HANGZHOU GREAT STAR INDUSTRIAL CO., LTD., Hangzhou City (CN)

( * ) Notice: Subject to any disclaimer, the term of this patent is extended or adjusted under 35 U.S.C. 154(b) by 116 days.

(21) Appl. No.: 18/893,448

(22) Filed: Sep. 23, 2024

(65) Prior Publication Data

US 2025/0010500 A1 Jan. 9, 2025

Related U.S. Application Data

(63) Continuation-in-part of application No. PCT/CN2022/129424, filed on Nov. 3, 2022.

(30) Foreign Application Priority Data

Mar. 24, 2022 (CN) ........................ 202210302933.0

(51) Int. Cl.
*B26B 13/26* (2006.01)
*B26B 13/14* (2006.01)
*B26D 3/16* (2006.01)

(52) U.S. Cl.
CPC .............. *B26B 13/26* (2013.01); *B26B 13/14* (2013.01); *B26D 3/169* (2013.01)

(58) Field of Classification Search
CPC .......... B26B 13/26; B26B 13/14; B26D 3/169
See application file for complete search history.

(56) References Cited

U.S. PATENT DOCUMENTS 4,368,577 A * 1/1983 Babb ....................... B26B 13/26 30/92
2017/0049060 A1* 2/2017 Chou ...................... B26B 13/26
(Continued)

FOREIGN PATENT DOCUMENTS

CN 205817925 U 12/2016
CN 210282381 U 4/2020
(Continued)

OTHER PUBLICATIONS

ISR and Written Opinion from PCT Application No. PCT/CN2022/129424, mailed Jan. 20, 2023, in Chinese with English Translation (16 pages).

*Primary Examiner* — Omar Flores Sanchez
(74) *Attorney, Agent, or Firm* — Fitch, Even, Tabin & Flannery LLP

(57) ABSTRACT

The present application provides a cutting tool including a grip portion and a cutting portion, wherein it further includes a blade feeding member coupled to both the cutting portion and the grip portion. The blade feeding member is configured to be actuated by an external force to achieve fast blade feeding for bringing a material to be cut into contact with both a fixed portion and a cutting edge of the cutting portion. The cutting tool provided in this application allows for fast blade feeding, which can quickly put a material to be cut into a ready-to-be-cut state where it can be cut. Therefore, significant improvements in cutting efficiency can be achieved.

21 Claims, 9 Drawing Sheets

(56) References Cited

U.S. PATENT DOCUMENTS

| | | | | |
|---|---|---|---|---|
| 2017/0113358 | A1* | 4/2017 | Glockseisen | B25B 7/12 |
| 2018/0222065 | A1* | 8/2018 | Chen | B26B 13/26 |
| 2022/0193941 | A1* | 6/2022 | Wilson | B26B 13/28 |
| 2022/0219342 | A1* | 7/2022 | Hesse | B26B 13/26 |
| 2022/0287511 | A1* | 9/2022 | Brandt | B26B 17/02 |

FOREIGN PATENT DOCUMENTS

| | | | |
|---|---|---|---|
| CN | 215511136 | U | 1/2022 |
| CN | 217345588 | U | 9/2022 |
| DE | 10024083 | C1 | 12/2001 |
| TW | M312407 | U | 5/2007 |
| WO | 2023179035 | A1 | 9/2023 |

* cited by examiner

CUTTING TOOL

RELATED APPLICATIONS

This application is a continuation-in-part (CIP) application claiming benefit of PCT/CN2022/129424 filed on Nov. 3, 2022, which claims priority to Chinese Patent Application No. 202210302933.0 filed on Mar. 24, 2022, the disclosures of which are incorporated herein in their entirety by reference.

FIELD OF THE INVENTION

The present application relates to a hand tool and, in particular, to a cutting tool.

DESCRIPTION OF THE PRIOR ART

Cutting tools are commonly used and typically include squeezable handles and a cutting portion including a cutting blade. The cutting portion can be opened to a certain angle to receive a material such as a tube to be cut. A user may squeeze the handles to reduce the opening angle of the cutting portion to accomplish cutting of the material to be cut.

Conventionally, in order to allow a greater cutting force to be applied, the blade is designed as a ratchet. For example, ratchet tube cutters are available for cutting PVC tubes. The use of such a tube cutter features pivoting the ratchet blade in ratcheting angle increments through squeezing the handles while preventing reverse ratcheting of the ratchet blade by means of a stopper. Every time the handles are squeezed, the ratchet blade pivots by one ratcheting angle increment, thus gradually reducing the opening angle or gap of the cutting portion until the cutting portion is partly or completely closed to accomplish the cutting action.

However, the conventional design is problematic in that, as it would be unknown beforehand what diametrical dimension a material to be cut has, the cutting portion is generally opened to a large angle or gap in order to accommodate a greater variety of such dimensions. Since every time the handles are squeezed, the opening angle or gap is reduced only by a small amount that is generally equal to one ratcheting angle increment, blade feeding is slow and it might be necessary for the handles to be squeezed many times before working edges of the cutting portion reach a ready-to-be-cut state where they both contact with a material to be cut. Further, as true cutting occurs only after such a ready-to-be-cut state is reached, this would lead to low cutting efficiency.

This would motivate those skilled in the art to develop a cutting tool allowing fast feeding of its ratchet blade and thereby providing higher cutting efficiency.

SUMMARY OF THE INVENTION

In one aspect of the present application, there is provided a cutting tool comprising a grip portion and a cutting portion, wherein the cutting tool further comprises a blade feeding member, the blade feeding member coupled to the cutting portion, the blade feeding member configured to be actuated by an external force to put a material to be cut into a ready-to-be-cut state.

Optionally, the cutting portion may comprise a first portion and a second portion, the first portion configured to be actuated by an external force to pivot toward a closed position or away relative to the second portion.

Optionally, the blade feeding member may be coupled to the first portion in order to actuate the first portion.

Optionally, the first portion may comprise a ratchet blade, the ratchet blade configured to be able to pivot about a first axis of rotation, and the blade feeding member may be configured so that the ratchet blade pivots an amount exceeding two times a ratcheting angle increment.

Optionally, the blade feeding member may comprise a first pin shaft, the first pin shaft coupled to the cutting portion, thereby coupling the blade feeding member to the cutting portion.

Optionally, the second portion may comprise a guide channel for receiving the first pin shaft and limiting a direction of movement for the first pin shaft.

Optionally, the guide channel may be arc-shape and arranged circumferentially around the first axis of rotation.

Optionally, the second portion may comprise a housing and the guide channel may comprise a cutout provided in the housing.

Optionally, the blade feeding member may comprise a raised ring which divides the first pin shaft into a first section and a second section.

Optionally, the raised ring may be configured to confine the first section within the housing.

Optionally, the ratchet blade may comprise a first contact portion and the first pin shaft may actuate the ratchet blade by contacting the first contact portion and applying pressure.

Optionally, the grip portion may include a first grip portion and the blade feeding member may be slidably coupled to the first grip portion.

Optionally, the blade feeding member may comprise a coupling link and a first coupling slot may be provided at a first end of the coupling link.

Optionally, the blade feeding member may comprise a second pin shaft and a second coupling slot for receiving the second pin shaft may be provided at a second end of the coupling link.

Optionally, the second pin shaft may be coupled to the first grip portion, thereby coupling the blade feeding member to the first grip portion.

Optionally, the first grip portion may comprise a slide slot for receiving the second pin shaft and the second pin shaft may be configured to be slidable within the slide slot, thereby slidably coupling the blade feeding member to the first grip portion.

Optionally, the coupling link may comprise a connecting section for connecting the second end to the first end.

Optionally, the connecting section may be slanted so that the second end is not in the same plane as the first end.

Optionally, the second end may be arranged parallel to the first end.

Optionally, the ratchet blade may comprise an avoidance portion.

Optionally, the avoidance portion may comprise a circumferentially-arranged arc-shaped notch.

Optionally, the cutting portion may comprise a ratchet blade, wherein: the grip portion includes a first grip portion provided with a slide slot; the blade feeding member comprises a coupling link and a first coupling slot for receiving a first pin shaft is provided at a first end of the coupling link; a second coupling slot for receiving a second pin shaft is provided at a second end of the coupling link; the second pin shaft is coupled to the slide slot, thereby slidably coupling the coupling link to the first grip portion; the ratchet blade comprises a circumferentially-arranged arc-shaped notch for avoiding interfering with the first pin shaft; and the coupling link comprises a slanted connecting section for connecting the first end to the second end.

The present application is beneficial in that the blade feeding member can be actuated by an external force to reduce an opening angle of the cutting portion by an amount exceeding two times the ratcheting angle increment, thereby achieving fast blade feeding. In particular, the blade feeding angle may be determined by a length of travel for the blade feeding member. In this way, the cutting portion of the cutting tool can more quickly put a material to be cut into a ready-to-be-cut state, resulting in significant improvements in cutting efficiency.

LIST OF REFERENCE NUMERALS

Figure 1:
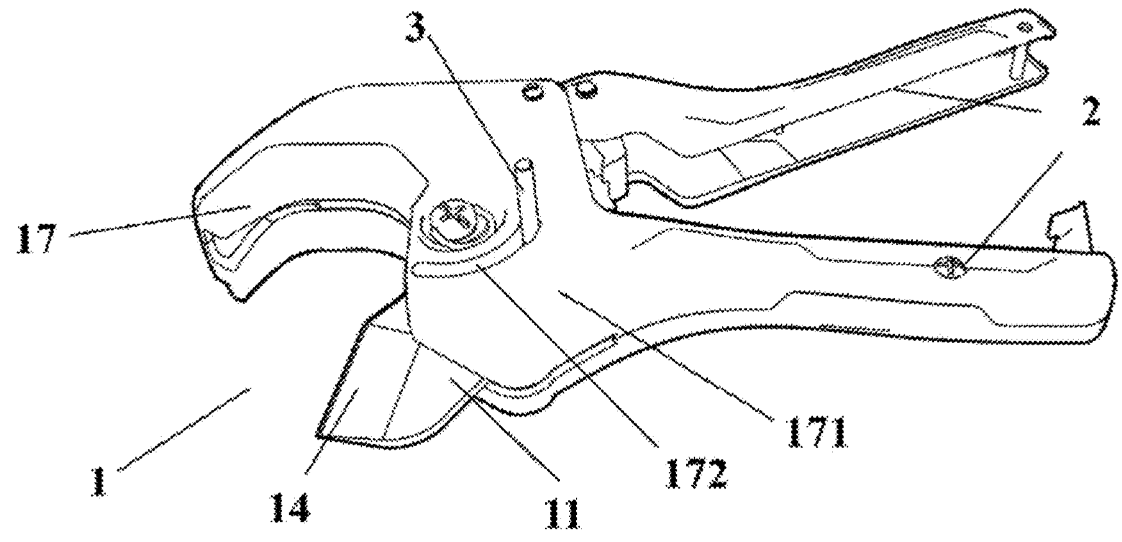
FIG. 1 is a schematic diagram showing the structure of an embodiment of the present application.

1, cutting portion; 11, ratchet blade; 111, first contact portion; 12, ratchet teeth; 13, first shaft hole; 14, cutting edge; 15, avoidance portion; 17, fixed portion; 171, housing; 172, guide channel; 2, grip portion; 21, first grip portion; 22, second grip portion; 23, slide slot; 3, blade feeding member; 31, coupling link; 311, second end; 312, first end; 313, second coupling slot; 314, first coupling slot; 315, connecting section; 32, second pin shaft; 33, first pin shaft; 34, raised ring; 35, first section; 36, second section; 4, material to be cut.

DETAILED DESCRIPTION OF THE PREFERRED EMBODIMENTS

A few preferred embodiments of the present application are described more fully below with reference to the accompanying drawings so that techniques thereof will become more apparent and more readily understood. The application can be embodied in various different forms and its scope is in no way limited to the embodiments disclosed herein.

Throughout the figures, structurally identical elements are indicated with the same reference numerals, and structurally or functionally similar elements are indicated with like reference numerals. The dimensions and thickness of each element in the drawings are shown arbitrarily, and the present application is not limited to any particular dimension or thickness of any element. In the figures, where appropriate, the thicknesses of some elements may be somewhat exaggerated for clarity.

As used herein, the directional terms, such as "up", "down", "front", "rear", "left", "right," "inside", "outside", "lateral", "top", "bottom", "upper", "lower" and "terminal", refer only to directions as viewed in the orientation of the figures and are intended to illustrate and describe the present application, rather than limit the scope thereof.

When an element is referred to as being "on" another element, it can be directly on the other element, or there may be an intervening element, to which it is attached, and which is in turn attached to the other element. When an element is referred to as being "mounted to" or "coupled to" another element, it will be understood that it can be "mounted" or "coupled" to the other element either directly or via an intervening element.

Example 1

FIG. 1 shows a cutting tool according to an embodiment of the present invention, which includes a cutting portion 1, a grip portion 2 and a blade feeding member 3. The blade feeding member 3 is coupled to the cutting portion 1. The cutting portion 1 can be opened to an angle to receive a material to be cut. When a material to be cut is received in the cutting portion 1, the cutting portion 1 can be partly or completely closed to accomplish a cutting task. Specifically, the cutting portion 1 includes a fixed portion 17 and a ratchet blade 11 (see FIG. 3). The ratchet blade 11 includes a cutting edge 14. The fixed portion 17 is configured to be stationary, and the ratchet blade 11 is configured to be pivotable about a first axis of rotation D (see FIG. 2). The fixed portion 17 (taken as a second portion) and the cutting edge 14 (as a first portion) define therebetween an opening angle a of the cutting portion 1 (see FIG. 2), which allows a material to be cut (not shown) to be received therein. When the ratchet blade 11 pivots under the action of an external force, the angle between the fixed portion 17 and the cutting edge 14 increases or decreases. Blade feeding of the cutting portion 1 decreases the angle. A tubular material to be cut enters a ready-to-be-cut state when it comes into contact with both the fixed portion 17 and the cutting edge 14.

Figure 2:
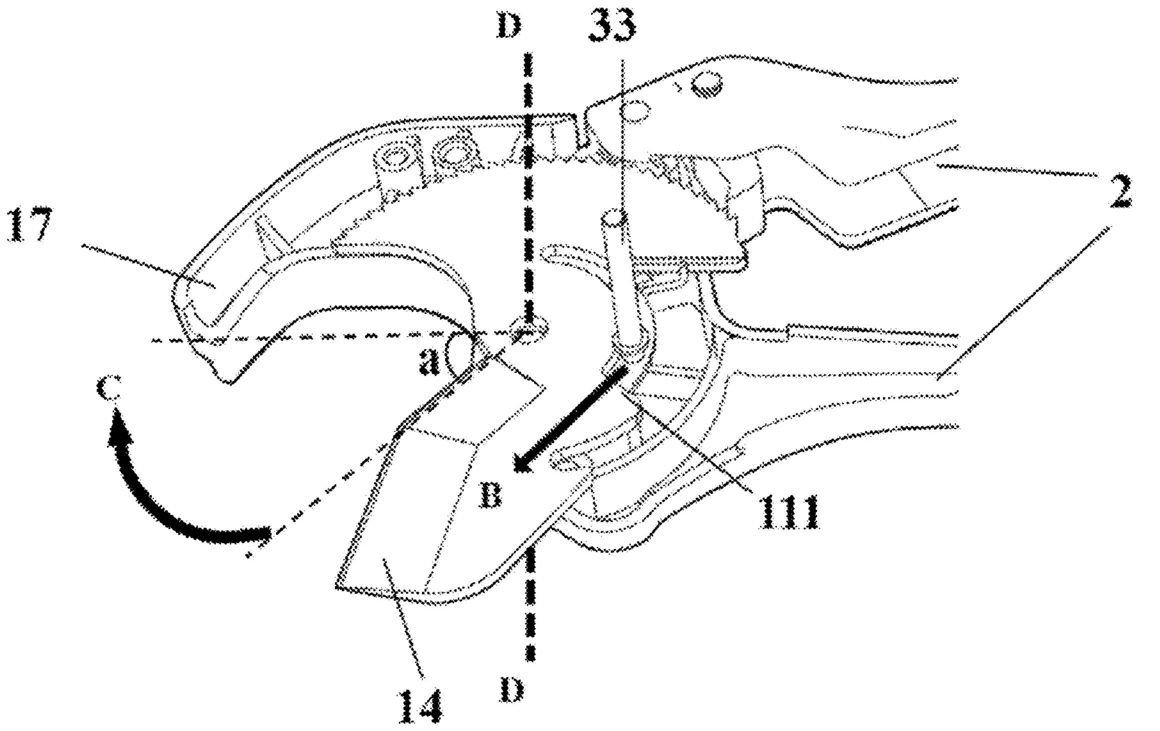
FIG. 2 schematically illustrates working principles of an embodiment of the present application.

As shown in FIGS. 1 and 2, in this embodiment, the blade feeding member 3 preferably includes a first pin shaft 33, which is detachably coupled to the ratchet blade 11, thereby connecting the blade feeding member 3 to the cutting portion 1. Specifically, the ratchet blade 11 includes a first contact portion 111, and when the first pin shaft 33 comes into contact with, and applies pressure to, the first contact portion 111, the ratchet blade 11 can be driven to pivot to achieve blade feeding. The fixed portion 17 includes a housing 171 defining a space around the ratchet blade 11, which is taken as the "interior" of the housing 171. The housing 171 has an arc-shaped cutout serving as a guide channel 172. The guide channel 172 is configured to receive the first pin shaft 33 and defines a direction of movement of the first pin shaft 33. The guide channel 172 extends circumferentially around the first axis of rotation D.

FIG. 2 illustrates the working principles of the present embodiment. A user may push or otherwise urge the first pin shaft 33 along the direction shown by the arrow B in the figure, causing the first pin shaft 33 to move circumferentially about the first axis of rotation D within the guide channel 172. When the first pin shaft 33 comes into contact with the first contact portion 111 of the ratchet blade 11 and exerts a force on the ratchet blade 11 through the first contact portion 111 in a direction not passing through the first axis of rotation D, the ratchet blade 11 can be caused to pivot in a direction toward the closed position of the cutting portion 1 (as shown by the arrow C in FIG. 2). That is, the blade feeding member 3 is configured to be driven by an external force to reduce the opening angle a of the cutting portion 1 (formed between the fixed portion 17 and the cutting edge 14).

Figure 3:
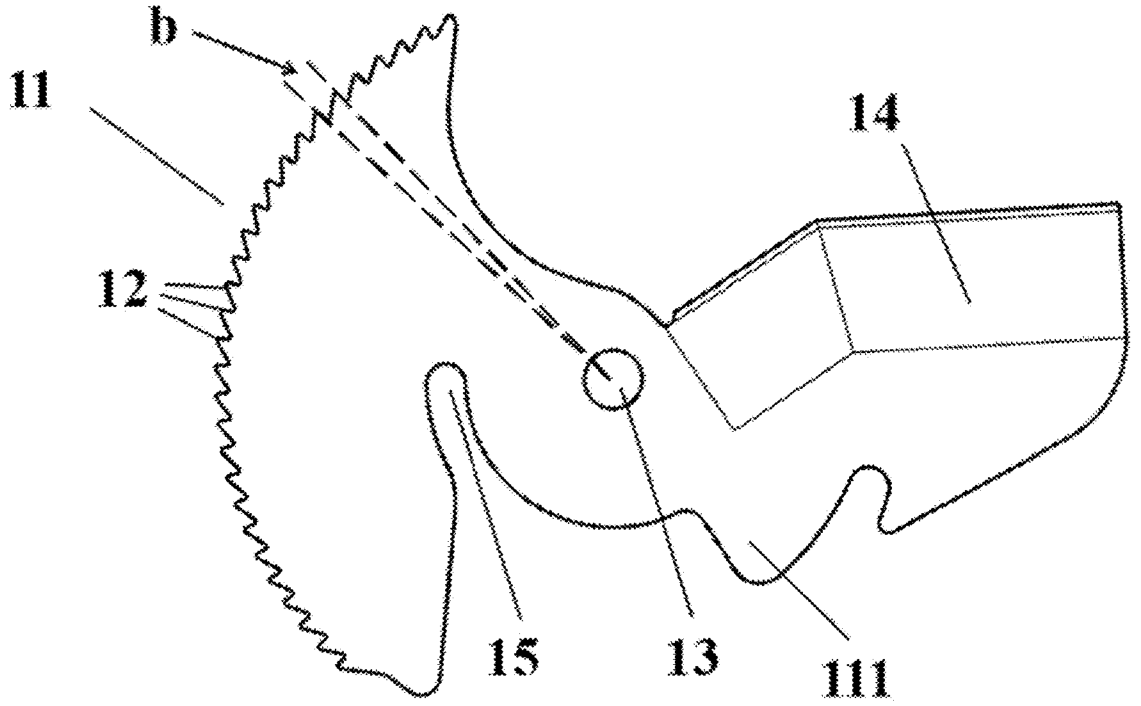
FIG. 3 is a schematic diagram showing the structure of a ratchet blade according to an embodiment of the present application.

FIG. 3 is a schematic diagram showing the structure of the ratchet blade 11 in this embodiment. The ratchet blade 11 includes a cutting edge 14, ratchet teeth 12 and an avoidance portion 15. The ratchet teeth 12 are evenly spaced at equal intervals along a circumference, and adjacent ratchet teeth 12 are separated by an equal angle of b. Conventionally, a latch pawl is usually used to act on the ratchet teeth 12. Every time the grip portion 2 is squeezed, the latch pawl pivots the ratchet blade 11 by an angle corresponding to one ratchet tooth 12, and accordingly the cutting edge 14 rotates by an angle b about the axis of rotation, decreasing the opening angle of the cutting portion 1 from a to a-b. Likewise, the grip portion 2 may be further squeezed multiple times to additionally decrease the opening angle of the cutting portion 1 to a-2*b* and so forth. In this way, blade feeding is achievable. The avoidance portion 15 is an arc-shaped notch formed circumferentially around the axis of rotation and can avoid interference of the first pin shaft 33 with the ratchet blade 11 during blade feeding. In practical applications, in order to accommodate more materials to be cut, the cutting portion 1 is opened beforehand to a large angle. Consequently, it may be the case that the fixed portion 17 and the cutting edge 14 fail to both come into contact with a material to be cut, i.e., fail to put the material to be cut into a ready-to-be-cut state, even after the grip portion 2 is squeezed many times. In fact, cutting of a material to be cut will truly start only after the material reaches a ready-to-be-cut state. Therefore, the prior art suffers from very low cutting efficiency. In contrast, with the arrangement of this embodiment, the blade feeding member 3 can be manipulated so that the ratchet blade 11 rotates an angle that is greater than or equal to two times the angle b corresponding to one ratchet tooth 12. The angle the ratchet blade 11 rotates under the actuation of the blade feeding member 3 depends on a length of travel for the blade feeding member 3. In this way, fast blade feeding can be achieved to put a material to be cut into a ready-to-be-cut state.

Figure 4:
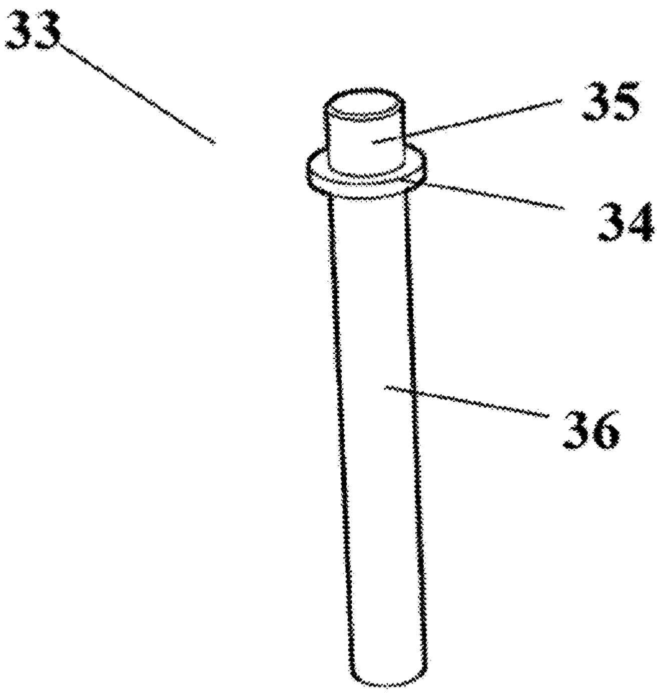
FIG. 4 is a schematic diagram showing the structure of a first pin shaft according to an embodiment of the present application.

FIG. 4 is a schematic diagram showing the structure of the first pin shaft 33 in this embodiment. The first pin shaft 33 includes a raised ring 34 extending around the first pin shaft 33 and dividing the first pin shaft 33 into a first section 35 and a second section 36. The raised ring 34 is slightly larger than the guide channel 172 so that dislodgement of the first pin shaft 33 from the interior of the housing 171 is prevented and that the first section 35 of the first pin shaft 33 is confined within the housing 171. Preferably, a length of the first section 35 is equal to a thickness of the ratchet blade 11.

Example 2

Figure 5:
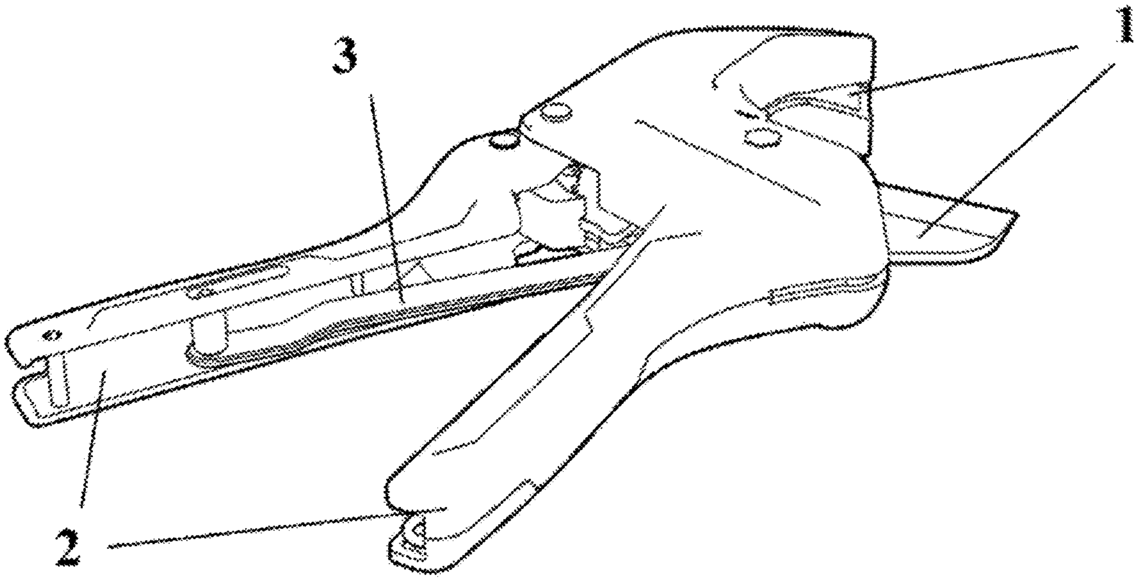
FIG. 5 is a schematic diagram showing the structure of an embodiment of the present application.
Figure 6:
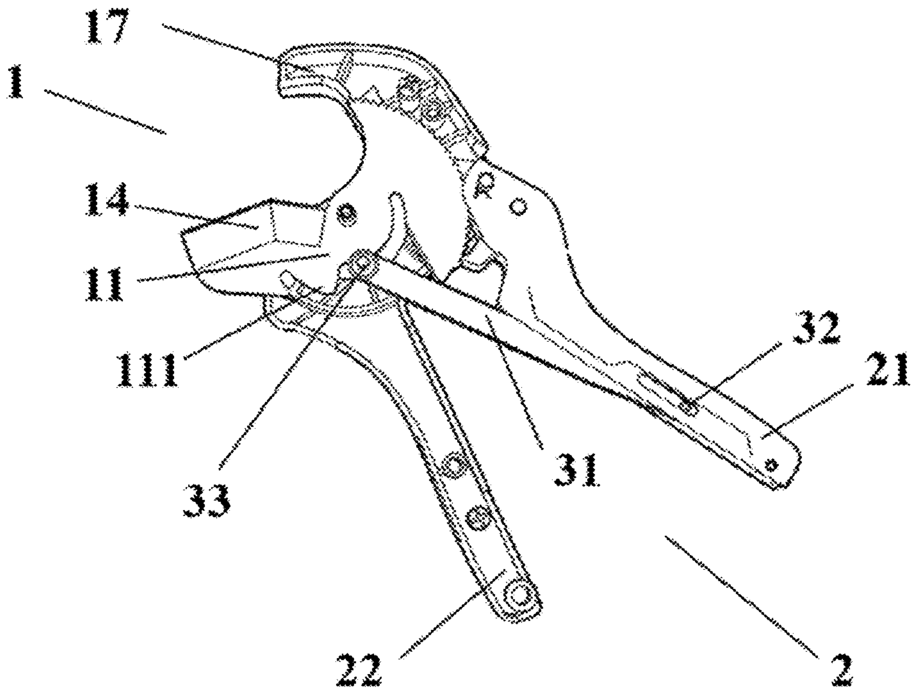
FIG. 6 is a schematic diagram showing the structure of an embodiment of the present application.

FIGS. 5 and 6 show a cutting tool according to an embodiment of the present invention, which includes a cutting portion 1, a grip portion 2 and a blade feeding member 3. One end of the blade feeding member 3 is coupled to the cutting portion 1, and the other end of the blade feeding member 3 is coupled to the grip portion 2. The cutting portion 1 can be opened to a certain angle to allow a material to be cut (not shown) to be received therein. When a material to be cut is placed within the cutting portion 1, the cutting portion 1 can be partly or completely closed to accomplish a cutting task. In this embodiment, the blade feeding member 3 is preferably actuated by the grip portion 2 to close the cutting portion 1 to quickly put a material to be cut into a ready-to-be-cut state, in which it is ready for being cut.

In this embodiment, the cutting portion 1 preferably includes a ratchet blade 11 including a first contact portion 111. The grip portion 2 includes a first grip portion 21 and a second grip portion 22. The blade feeding member 3 includes a coupling link 31, a second pin shaft 32 and a first pin shaft 33. The coupling link 31 is slidably coupled to the first grip portion 21 by the second pin shaft 32. Moreover, the coupling link 31 is coupled to the ratchet blade 11 by the first pin shaft 33. The coupling link 31 can actuate the first pin shaft 33 to rotate the ratchet blade 11.

Figure 7:
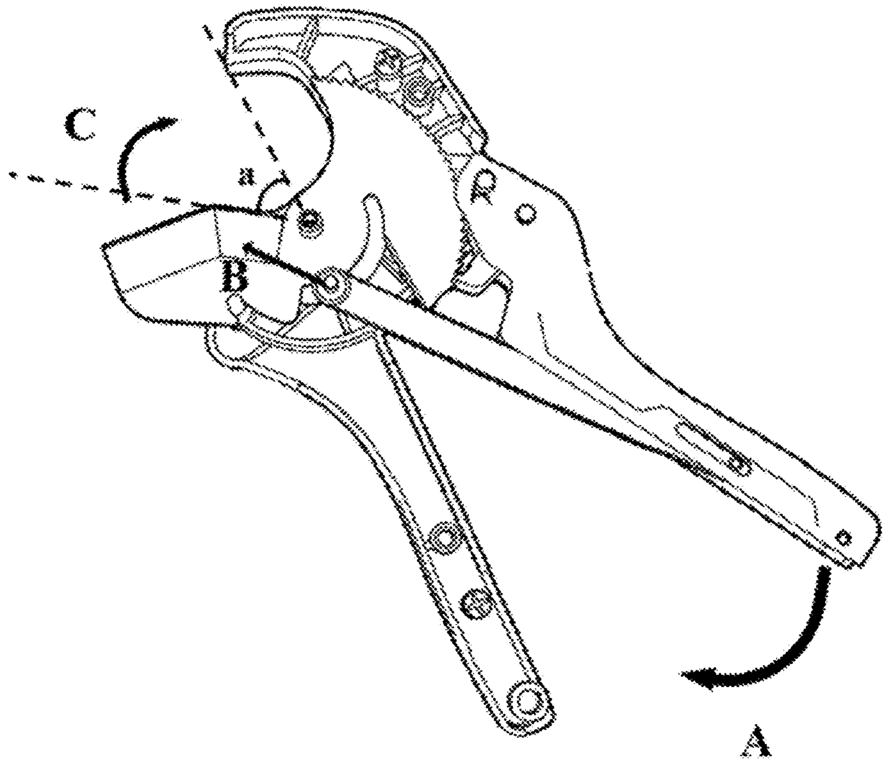
FIG. 7 schematically illustrates the working principles of an embodiment of the present application.

FIG. 7 shows the working principles of this embodiment. A user may squeeze the grip portion 2 to cause the first grip portion 21 to move toward the second grip portion 22 (in the direction as shown by the arrow A in FIG. 7). As the second pin shaft 32 is coupled to the first grip portion 21, the coupling link 31 is actuated by the first grip portion 21 to move in its lengthwise direction (as shown by the arrow B in FIG. 7), causing the first pin shaft 33 to also move in this direction shown by the arrow B. Upon the first pin shaft 33 coming into contact with the first contact portion 111 and applying pressure thereto, it will exert a force on the ratchet blade 11 in a direction not passing the first axis of rotation D (see FIG. 2), causing the ratchet blade 11 to rotate toward the closed position of the cutting portion 1 (i.e., in the direction as shown by the arrow C in FIG. 7). That is, the blade feeding member 3 is configured to reduce an opening angle a of the cutting portion 1 (formed between the fixed portion 17 and the cutting edge 14) under the actuation of the grip portion 2. In this embodiment, the ratchet blade 11 is of the same structure as that of Example 1 (see FIG. 3). In this embodiment, actuated by the first grip portion 21, the coupling link 31 allows the ratchet blade 11 to rotate an angle b greater than or equal to two times an angle corresponding to one ratchet tooth 12 by a single action of squeezing the grip portion 2. The angle the ratchet blade 11 rotates depends on a length of travel for the coupling link 31. More preferably, in this embodiment, a material to be cut can be brought into a ready-to-be-cut state where it contacts both the fixed portion 17 and the cutting edge 14 as a result of a single action of squeezing the grip portion 2.

Figure 8:
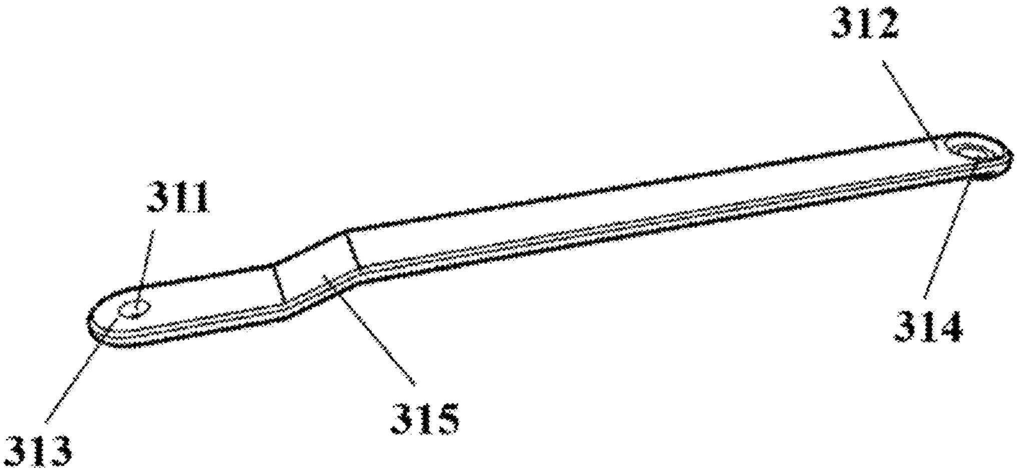
FIG. 8 is a schematic diagram showing the structure of a coupling link according to an embodiment of the present application.

FIG. 8 shows the coupling link 31 in this embodiment. The coupling link 31 comprises a second end 311 and a first end 312. The second end 311 defines a second coupling slot 313, and the first end 312 defines a first coupling slot 314. The second coupling slot 313 is adapted to receive the second pin shaft 32 and thereby accomplish the coupling with the first grip portion 21. The first coupling slot 314 is adapted to receive the first pin shaft 33 and thereby accomplish the coupling with the ratchet blade 11. The second end 311 is connected to the first end 312 by a connecting section 315. In this embodiment, the connecting section 315 is slanted so that the second end 311 is parallel to, but is not in the same plane as, the first end 312. With this arrangement, interference with other components in the first grip portion 21 can be avoided, and the cutting tool is allowed to have a smaller size.

Figure 9:
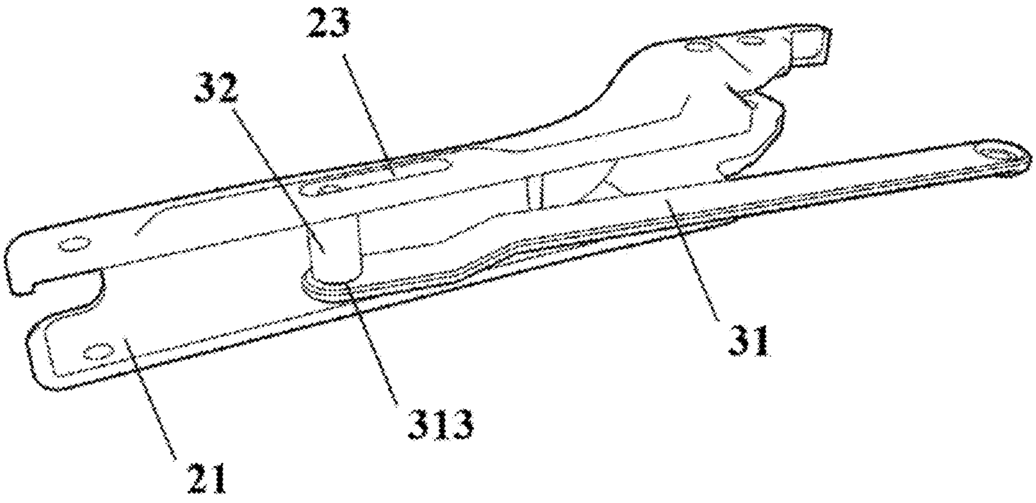
FIG. 9 schematically illustrates coupling of a coupling link with a grip portion according to an embodiment of the present application.

FIG. 9 shows coupling of the coupling link 31 with the first grip portion 21 in this embodiment. In this embodiment, a slide slot 23 is preferably provided in a wall of the first grip portion 21. The slide slot 23 is configured to receive the second pin shaft 32 that is inserted in the second coupling slot 313 of the coupling link 31, thereby slidably coupling the coupling link 31 to the first grip portion 21. Individual positions of the second pin shaft 32 in the slide slot 23 correspond to different lengths of travel for the ratchet blade 11 under the actuation of the coupling link 31 as a result of a single action of squeezing the grip portion 2, which enable the cutting tool to accommodate materials of various sizes to be cut.

FIGS. 10 to 16 schematically illustrate preparatory operations for cutting of materials 4 of different sizes to be cut in this embodiment.

Figure 10:
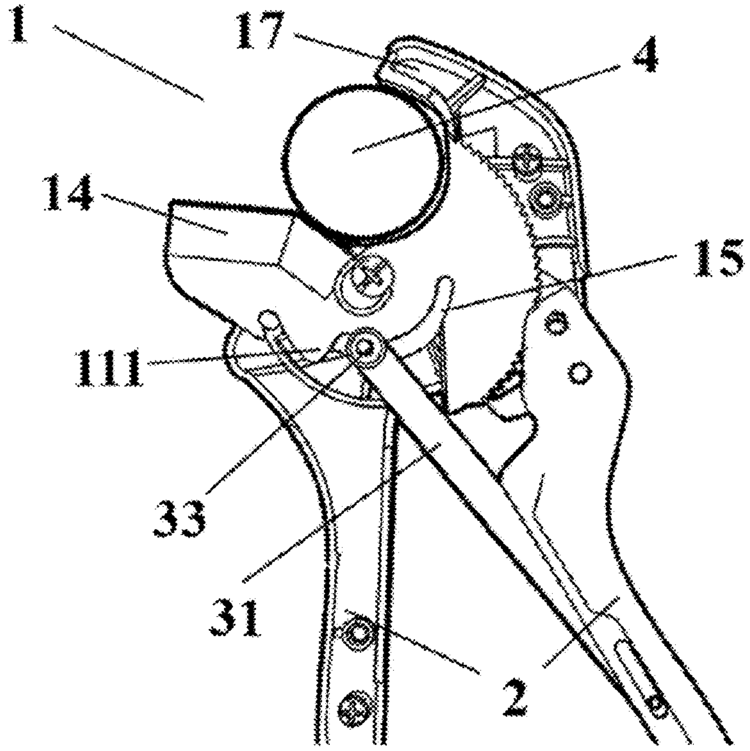
FIG. 10 schematically illustrates operation according to an embodiment of the present application.

FIG. 10 shows a material 4 to be cut having a dimension (e.g., diameter) which is so large that the material 4 to be cut is in contact with both the fixed portion 17 and the cutting edge 14 (i.e., in a ready-to-be-cut state) once it is received in the cutting portion. In this case, when a user squeezes the grip portion 2 (e.g., in the direction as shown by the arrow A in FIG. 7), the first pin shaft 33 will be actuated by the coupling link 31 to move circumferentially in the avoidance portion 15, bringing the first pin shaft 33 into contact with the first contact portion 111. Although the ratchet blade 11 tends to rotate when the first pin shaft 33 applies pressure to the first contact portion 111, the presence of the material 4 to be cut makes it impossible for the pressure to actually cause a rotation of the ratchet blade 11. Therefore, the material 4 to be cut is in a ready-to-be-cut state, in which a latch pawl (not shown) can be relied on to actuate the ratchet blade 11 to cut the material.

Figure 11:
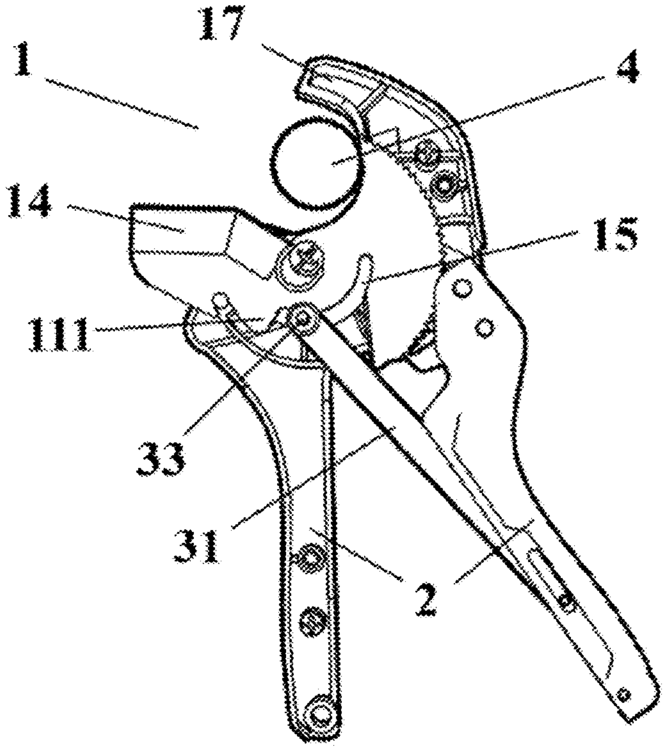
FIG. 11 schematically illustrates operation according to an embodiment of the present application.
Figure 12:
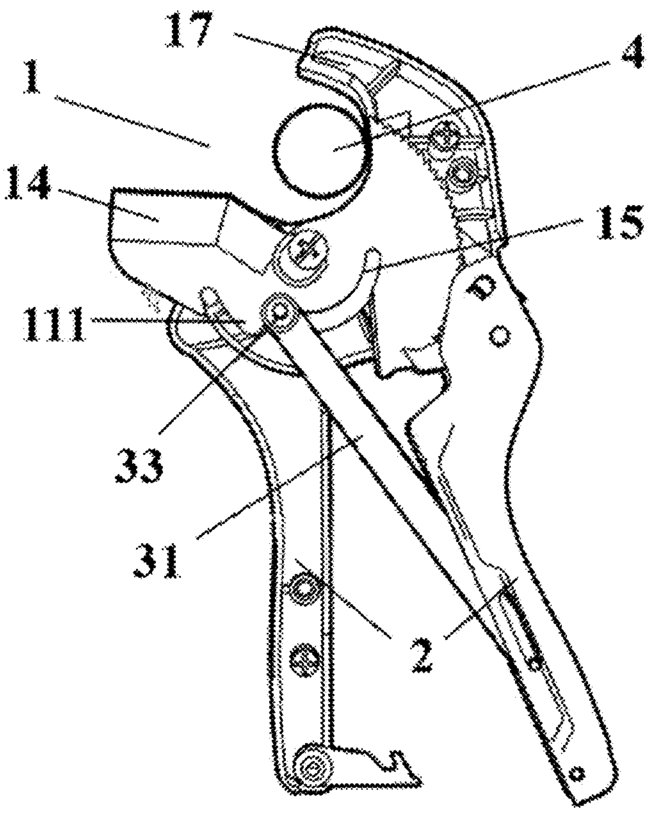
FIG. 12 schematically illustrates operation according to an embodiment of the present application.
Figure 13:
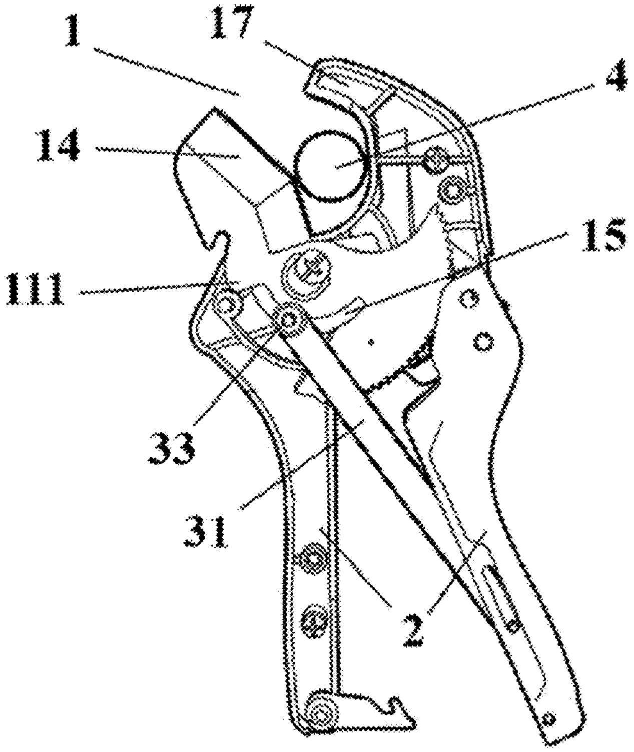
FIG. 13 schematically illustrates operation according to an embodiment of the present application.

As shown in FIG. 11, in more scenarios, a material 4 to be cut would be slightly smaller than an opening of the cutting portion 1 (a material 4 to be cut larger than the opening of the cutting portion 1 cannot be received in the cutting portion 1). In these cases, if the material 4 to be cut is brought into contact with the fixed portion 17, it will not contact the cutting edge 14. Therefore, it is not in a ready-to-be-cut state yet. Conventionally, as blade feeding is effectuated simply by a latch pawl, the ratchet blade 11 can rotate by only the angle b (see FIG. 3) every time the latch pawl is actuated (by squeezing the grip portion 2). In order to put the material 4 to be cut into a ready-to-be-cut state, it may be necessary to squeeze the grip portion 2 many times, making the cutting task time-consuming and inefficient. In contrast, with the arrangement of this embodiment, when a user squeezes the grip portion 2, the coupling link 31 coupled to the grip portion 2 actuates the first pin shaft 33. When the first pin shaft 33 comes into contact with the first contact portion 111 (see FIG. 12), it will rotate the ratchet blade 11, achieving blade feeding. In this process of blade feeding, an angle the ratchet blade 11 rotates is determined by a length of travel for the coupling link 31, rather than by a latch pawl. For this reason, the ratchet blade 11 can be rotated an angle much greater than the angle b by a single action of squeezing the grip portion 2, allowing for fast blade feeding. The blade feeding process ends and the material 4 to be cut enters a ready-to-be-cut state upon it coming into contact with the material 4 to be cut (see FIG. 13). At this time, the user can release the grip portion 2. Although the first pin shaft 33 tends to move away from the first contact portion 111 when so actuated by the coupling link 31, due to the presence of the avoidance portion 15, the first pin shaft 33 will instead move within the avoidance portion 15 without pivoting the ratchet blade 11 in the opposite direction. Further, according to the present embodiment, a latch pawl (not shown) is provided to prevent the opposite pivoting of the ratchet blade 11 and allow the user to perform a cutting task by again squeezing the grip portion 2. According to this embodiment, as fast blade feeding can be achieved, and the material 4 to be cut can be brought into a ready-to-be-cut state, by a user's single action of squeezing the grip portion 2, the cutting efficiency is greatly improved.

Figure 14:
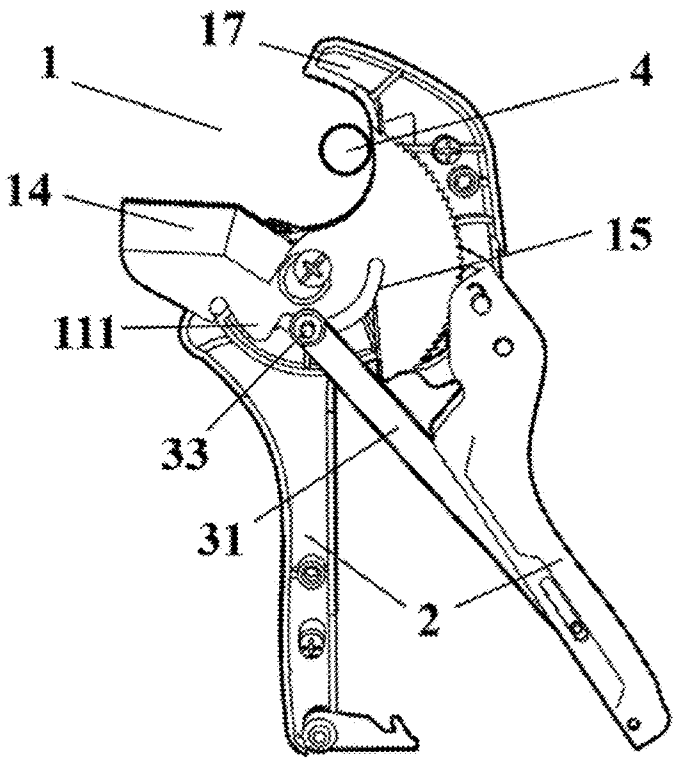
FIG. 14 schematically illustrates operation according to an embodiment of the present application.
Figure 15:
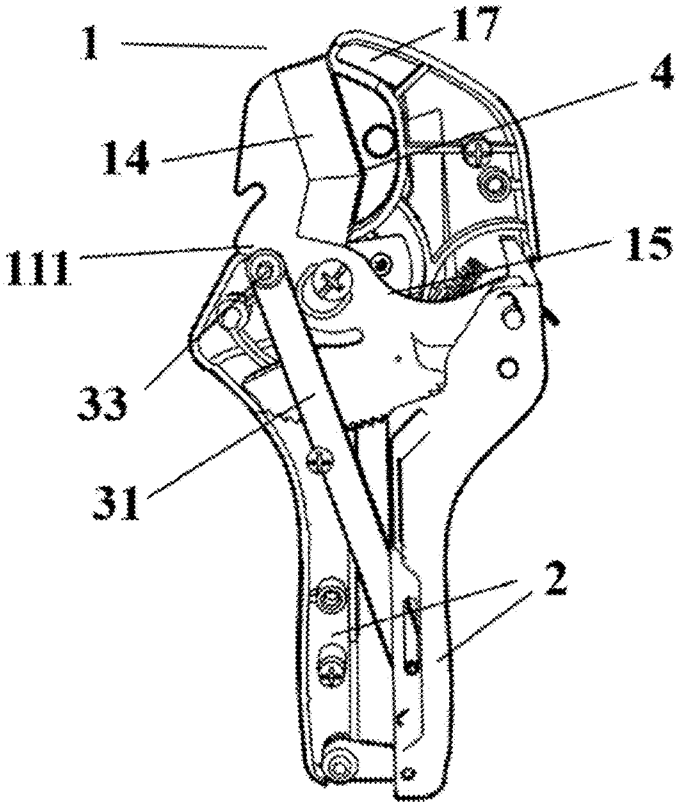
FIG. 15 schematically illustrates operation according to an embodiment of the present application.
Figure 16:
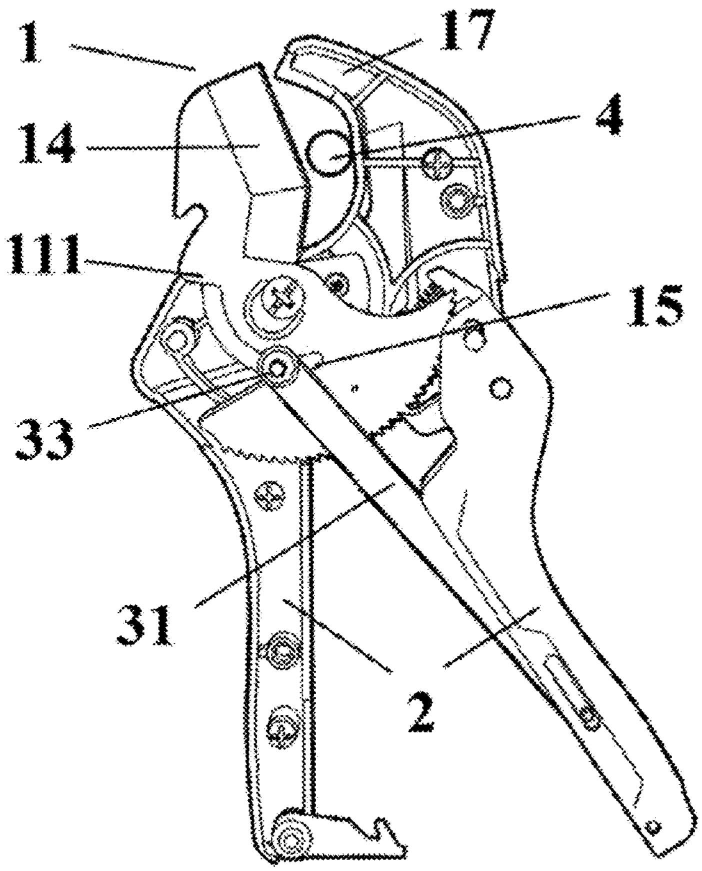
FIG. 16 schematically illustrates operation according to an embodiment of the present application.

As shown in FIG. 14, in some scenarios, a material 4 to be cut is even smaller. In this case, according to the prior art, it would be necessary to squeeze the grip portion 2 even more times to put the material 4 to be cut into a ready-to-be-cut state. In contrast, with the arrangement of this embodiment, when a user squeezes the grip portion 2, the coupling link 31 coupled to the grip portion 2 actuates the first pin shaft 33. When the first pin shaft 33 comes into contact with the first contact portion 111, it will rotate the ratchet blade 11, achieving blade feeding. It may be the case that the ratchet blade 11 does not come into contact with the material 4 to be cut, i.e., it fails to enter a ready-to-be-cut state, when the coupling link 31 reaches the end of its length of travel, as shown in FIG. 15. In this case, the user may return the grip portion 2 to their original positions, as shown in FIG. 16. Although the first pin shaft 33 tends to move away from the first contact portion 111 when so actuated by the coupling link 31, due to the presence of the avoidance portion 15, the first pin shaft 33 will instead move within the avoidance portion 15 without pivoting the ratchet blade 11 in the opposite direction. Moreover, the latch pawl (not shown) will also help to block the opposite pivoting of the ratchet blade 11. After the grip portion 2 is returned to the original positions, the user may again squeeze the grip portion 2 to achieve further blade feeding instead by means of the latch pawl until the material 4 to be cut is put into a ready-to-be-cut state. In these cases, although the user cannot put the material 4 to be cut into a ready-to-be-cut state by a single action of squeezing the grip portion 2, faster blade feeding and hence increased cutting efficiency can still be provided.

Although a few preferred specific embodiments of the present application have been described in detail above, it will understood that those of ordinary skill in the art can make various modifications and changes thereto based on the concept of the present application without exerting any creative effort. Accordingly, all variant embodiments that can be obtained by those skilled in the art through logical analysis, inference or limited experimentation in accordance with the concept of the present invention on the basis of the prior art are intended to fall within the scope as defined by the appended claims.

The invention claimed is:

1. A cutting tool comprising a grip portion and a cutting portion, wherein the cutting tool further comprises a blade feeding member, the blade feeding member coupled to the cutting portion, the blade feeding member configured to be actuated by an external force to put a material to be cut into a ready-to-be-cut state; and wherein the grip portion includes a first grip portion and the blade feeding member is slidably coupled to the first grip portion.

2. The cutting tool of claim 1, wherein the cutting portion comprises a first portion and a second portion, the first portion configured to be actuated by the external force to pivot toward a closed position or away relative to the second portion.

3. The cutting tool of claim 2, wherein the blade feeding member is coupled to the first portion in order to actuate the first portion.

4. The cutting tool of claim 3, wherein the first portion comprises a ratchet blade, the ratchet blade configured to be able to pivot about a first axis of rotation, and the blade feeding member is configured so that the ratchet blade pivots an amount exceeding two times a ratcheting angle increment.

5. The cutting tool of claim 4, wherein the blade feeding member comprises a first pin shaft, the first pin shaft coupled to the cutting portion, thereby coupling the blade feeding member to the cutting portion.

6. The cutting tool of claim 5, wherein the second portion comprises a guide channel for receiving the first pin shaft and limiting a direction of movement for the first pin shaft.

7. The cutting tool of claim 6, wherein the guide channel is arc-shape and arranged circumferentially around the first axis of rotation.

8. The cutting tool of claim 7, wherein the second portion comprises a housing and the guide channel comprises a cutout provided in the housing.

9. The cutting tool of claim 8, wherein the blade feeding member comprises a raised ring which divides the first pin shaft into a first section and a second section.

10. The cutting tool of claim 9, wherein the raised ring is configured to confine the first section within the housing.

11. The cutting tool of claim 5, wherein the ratchet blade comprises a first contact portion and the first pin shaft actuates the ratchet blade by contacting the first contact portion and applying pressure.

12. The cutting tool of claim 1, wherein the blade feeding member comprises a coupling link and a first coupling slot is provided at a first end of the coupling link.

13. The cutting tool of claim 12, wherein the blade feeding member comprises a second pin shaft and a second coupling slot for receiving the second pin shaft is provided at a second end of the coupling link.

14. The cutting tool of claim 13, wherein the second pin shaft is coupled to the first grip portion, thereby coupling the blade feeding member to the first grip portion.

15. The cutting tool of claim 14, wherein the first grip portion comprises a slide slot for receiving the second pin shaft and the second pin shaft is configured to be slidable within the slide slot, thereby slidably coupling the blade feeding member to the first grip portion.

16. The cutting tool of claim 14, wherein the coupling link comprises a connecting section for connecting the second end to the first end.

17. The cutting tool of claim 16, wherein the connecting section is slanted so that the second end is not in the same plane as the first end.

18. The cutting tool of claim 17, wherein the second end is arranged parallel to the first end.

19. The cutting tool of claim 4, wherein the ratchet blade comprises an avoidance portion.

20. The cutting tool of claim 19, wherein the avoidance portion comprises a circumferentially-arranged arc-shaped notch.

21. The cutting tool of claim 1, wherein the cutting portion comprises a ratchet blade; the first grip portion is provided with a slide slot; the blade feeding member comprises a coupling link and a first coupling slot for receiving a first pin shaft is provided at a first end of the coupling link; a second coupling slot for receiving a second pin shaft is provided at a second end of the coupling link; the second pin shaft is coupled to the slide slot, thereby slidably coupling the coupling link to the first grip portion; the ratchet blade comprises a circumferentially-arranged arc-shaped notch for avoiding interfering with the first pin shaft; and the coupling link comprises a slanted connecting section for connecting the first end to the second end.

* * * * *